(12) United States Patent
Suresh et al.

(10) Patent No.: US 9,584,064 B2
(45) Date of Patent: Feb. 28, 2017

(54) SYSTEM AND METHOD FOR AUTONOMOUS ADAPTIVE CLEANING OF PV PANELS BASED ON HIGH LEVEL CONTROL SIGNALS

(71) Applicant: Siemens Aktiengesellschaft, Munich (DE)

(72) Inventors: Sindhu Suresh, Monroe Township, NJ (US); Anthony Weber, Kendall Park, NJ (US); Parag Patre, North Brunswick, NJ (US)

(73) Assignee: Siemens Aktiengesellschaft, Munich (DE)

( * ) Notice: Subject to any disclaimer, the term of this patent is extended or adjusted under 35 U.S.C. 154(b) by 825 days.

(21) Appl. No.: 13/648,369

(22) Filed: Oct. 10, 2012

(65) Prior Publication Data
US 2014/0100698 A1    Apr. 10, 2014

(51) Int. Cl.
| | |
|---|---|
| G05F 5/00 | (2006.01) |
| G05D 15/00 | (2006.01) |
| A46B 13/00 | (2006.01) |
| H02S 40/10 | (2014.01) |
| A46B 13/02 | (2006.01) |
| F24J 2/46 | (2006.01) |

(52) U.S. Cl.
CPC .............. *H02S 40/10* (2014.12); *A46B 13/02* (2013.01); *F24J 2/461* (2013.01)

(58) Field of Classification Search
CPC .......... A46B 13/00; A46B 13/02; F24J 2/461; H02S 40/10

USPC .................... 700/275, 291; 15/21.1
See application file for complete search history.

(56) References Cited

U.S. PATENT DOCUMENTS

| | | | | |
|---|---|---|---|---|
| 8,785,829 | B2* | 7/2014 | Cherukupalli | .... H01L 31/02021 136/244 |
| 8,872,083 | B2* | 10/2014 | Cherukupalli | .... H01L 31/02021 136/244 |
| 9,020,636 | B2* | 4/2015 | Tadayon | .................... B25J 5/02 700/247 |
| 9,154,075 | B2* | 10/2015 | Chen | ...................... G01K 13/00 |
| 9,457,463 | B2* | 10/2016 | Tadayon | .................. B25J 5/02 |

(Continued)

OTHER PUBLICATIONS

Anderson, Mark, et al., "Robotic Device for Cleaning Photovoltaic Panel Arrays", Green Project—Sustainable Technology and Energy Solutions, downloaded from http://www.coe.neu.edu/Research/robots/papers/CLAWAR09.pdf on Sep. 24, 2012, 11 pages.

(Continued)

*Primary Examiner* — Charles Kasenge

(57) ABSTRACT

A solar energy system and method of cleaning photovoltaic panels is provided. Measurements relating to weather at a photovoltaic panel are received by the system. Measurements relating to output current and voltage at the photovoltaic panel are received by the system. Expected power of the photovoltaic panel is determined based on the measurements relating to weather. Actual power of the photovoltaic panel is determined based on the measurements relating to output current and voltage. In response to determining that the actual power is not within a predetermined range of the expected power (e.g. at least one photovoltaic panel is dirty), a cleaning of the photovoltaic panel is initiated.

16 Claims, 10 Drawing Sheets

(56) References Cited

U.S. PATENT DOCUMENTS

2010/0212093 A1\* 8/2010 Pak et al. .................. 15/97.1
2012/0152877 A1\* 6/2012 Tadayon .................. B25J 5/02
                                                                                                 212/224
2012/0310427 A1\* 12/2012 Williams .................. G05F 1/67
                                                                                                 700/287

OTHER PUBLICATIONS

"Heliotex Automatic Simple Solar Cleaning Systems", downloaded from http://simplysolarcleaning.com on Sep. 24, 2012, 3 pages.
"Solar Panel Cleaning Systems", downloaded from http://solarpanelcleaningsystens.com on Sep. 24, 2012, 1 page.
"OCS Energy", downloaded from http://www.ocsenergy.com/solar_wash/ on Sep. 24, 2012, 2 pages.

\* cited by examiner

SYSTEM AND METHOD FOR AUTONOMOUS ADAPTIVE CLEANING OF PV PANELS BASED ON HIGH LEVEL CONTROL SIGNALS

TECHNICAL FIELD

This present invention relates generally to systems, methods and apparatus for providing autonomous adaptive cleaning of photovoltaic (PV) panels based on high level control signals and more particularly to systems, methods and apparatus for autonomous adaptive cleaning of PV panels in a solar energy system when the panels are determined to require cleaning.

BACKGROUND

Photovoltaic (PV) panels generate electrical power by converting solar radiation into direct current electricity. PV panels are made up of solar cells that contain photovoltaic material. Solar cells produce direct current electricity converted from solar radiation. Examples of photovoltaic materials used in PV panels include monocrystalline silicon, polycrystalline silicon, amorphous silicon, cadmium telluride, and copper indium gallium selenide/sulfide, etc.

The electricity converted by PV panels can be used as a source of cleaner power when compared to other power sources (e.g. fossil fuels).

SUMMARY

In accordance with an embodiment, a method of cleaning photovoltaic panels in a solar energy system is provided. Measurements relating to weather at at least one photovoltaic panel are received. Measurements relating to output current and voltage at the least one photovoltaic panel are received. Expected power of the at least one photovoltaic panel is determined based on the measurements relating to weather. Actual power of the at least one photovoltaic panel is determined based on the measurements relating to output current and voltage. In response to determining that the actual power is not within a predetermined range of the expected power (e.g. at least one photovoltaic panel is dirty), a cleaning of the photovoltaic panel is initiated.

In an embodiment, a data log is updated with a location of the cleaning, a time stamp of the cleaning and a number of cleaning cycles.

In an embodiment, if the number of cleaning cycles exceeds a threshold limit, the data log is updated to recommend a manual inspection of the least one photovoltaic panel.

In an embodiment, if the threshold limit for the cleaning count has been reached, future cleanings of the at least one photovoltaic panel are disabled.

In an embodiment, the measurements relating to weather comprise measurements relating to at least one of irradiance, temperature, wind speed, shading, and clouding.

In an embodiment, prior to the step of initiating a cleaning of the at least one photovoltaic panel, a wait for a period of time occurs after the step of determining actual power of the at least one photovoltaic panel. Second measurements relating to weather at the at least one photovoltaic panel are received after waiting the period of time. Second measurements relating to output current and voltage at the at least one photovoltaic panel are received after waiting the period of time. Second expected power of the at least one photovoltaic panel based on the second measurements relating to weather is determined. Second actual power of the at least one photovoltaic panel based on the second measurements relating to the output current and voltage is determined. A determination is made that the second actual power is not within the predetermined range of the second expected power.

In an embodiment, the at least one photovoltaic panel comprises a string of photovoltaic panels.

In accordance with an embodiment, a system comprises sensors, a supervisory controller, and a photovoltaic cleaning assembly. The sensors are configured to measure weather related conditions, and output current and voltage of at least one photovoltaic panel. The supervisory controller is configured to generate a control signal to initiate a cleaning of the at least one photovoltaic panel. The control signal is generated based at least on an expected power of the at least one photovoltaic panel based on the measurements relating to weather and an actual power of the at least one photovoltaic panel based on the measurements relating to output current and voltage. The photovoltaic cleaning assembly is disposed on an array of photovoltaic panels. The photovoltaic cleaning assembly is configured to clean the at least one photovoltaic panel in response to receiving the control signal from the supervisory controller.

In an embodiment, the supervisory controller is further configured to determine whether the actual power is within a predetermined range of the expected power.

In an embodiment, the photovoltaic cleaning assembly further comprises a brush assembly comprising at least one of a rotating brush, bristles, nozzles, actuators, a motor and a squeegee.

In an embodiment, the measurements related conditions comprise measurements relating to at least one of irradiance, temperature, wind speed, shading, and clouding.

In an embodiment, the at least one photovoltaic panel comprises a string of photovoltaic panels.

In an embodiment, the sensors comprise at least one of an anemometer, a pyranometer, a current sensor, a voltage sensor and a temperature sensor.

These and other advantages of the present disclosure will be apparent to those of ordinary skill in the art by reference to the following Detailed Description and the accompanying drawings.

DETAILED DESCRIPTION

PV panel farms are mostly maintained manually and require labor hours which lead to inefficiencies and added costs. Manual maintenance of PV panels in PV farms is also time consuming. When dirt or debris collects on PV panels, in existing systems, manual cleaning of the dirt may be provided on a scheduled basis. In scheduled systems, PV panels are cleaned based on a schedule, regardless of whether cleaning is required or not. Thus, all PV panels are cleaned together instead of selectively cleaning only the dirty panels. Cleaning the PV panels in such a manner leads to waste in terms of water, soap, chemicals, etc. In addition, additional expenses could be incurred due to unnecessary labor.

Any accumulation of dust and debris on PV panels adversely affects energy generation by blocking the incident sun light. Manual cleaning methods may not be cost-effective in terms of water and energy use. Also, personal safety is at risk as maintenance personnel are exposed to cleaning chemicals, adverse weather conditions, and elevated/higher surfaces. PV panel cleaning may be based on a schedule which has no dependence on the amount of dust and debris accumulated on the panel.

Some scheduled cleaning systems require a large amount of cleaning solution in order to clean PV panels. These systems are not only energy inefficient, but are also cost inefficient as a larger pump and additional plumbing may be required.

Embodiments of the present invention provide a new and efficient method of cleaning PV panels based on control signals from a supervisory controller. In an embodiment of the present application, a decision making algorithm embedded in the supervisory controller receives signals from a converter coupled to the PV farm and from sensors connected to the PV panels. Based on a comparison of measured weather related conditions, output voltage and current with expected weather related conditions, output voltage and current, the supervisory controller sends signals to a programmable logic controller (PLC) to initiate the cleaning procedures. Coordination and communication between sensors, actuators, and control signals issued from the supervisory controller based on a decisive algorithm allow cleaning of PV panels only when needed. Therefore, unnecessary cleaning of PV panels is reduced.

Figure 1:
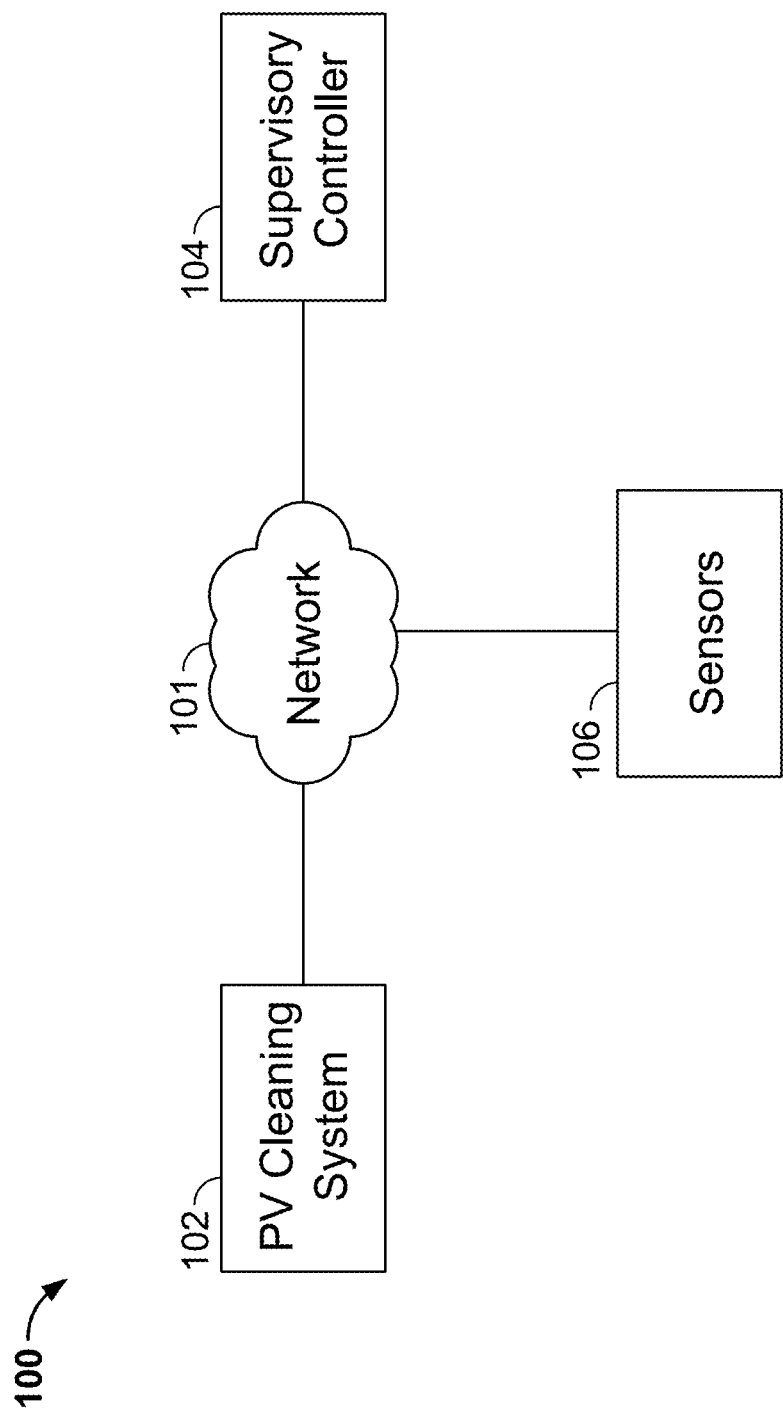
FIG. 1 depicts a PV cleaning system, in accordance with an embodiment of the present invention.

FIG. 1 depicts a PV cleaning system, in accordance with an embodiment of the present invention. FIG. 1 shows a cleaning system 100 including a PV cleaning system 102, a supervisory controller 104 and sensors 106. PV cleaning system 102, sensors 106 and supervisory controller 104 communicate via network 101.

In the exemplary embodiment of FIG. 1, network 101 is the Internet. In other embodiments, network 101 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 101 may include a combination of different types of networks.

In an embodiment, PV cleaning system 102, sensors 106 and supervisory controller 104 may be connected to network 101 by a wired or wireless connection. In an embodiment, PV cleaning system 102, sensors 106 and/or supervisory controller 104 may be tethered together via a bus. Specifically, communication may be established using Process Field BUS (PROFIBUS).

A user may input commands onto supervisory controller 104. In an advantageous embodiment, minimal or no user input may be needed.

Figure 4:
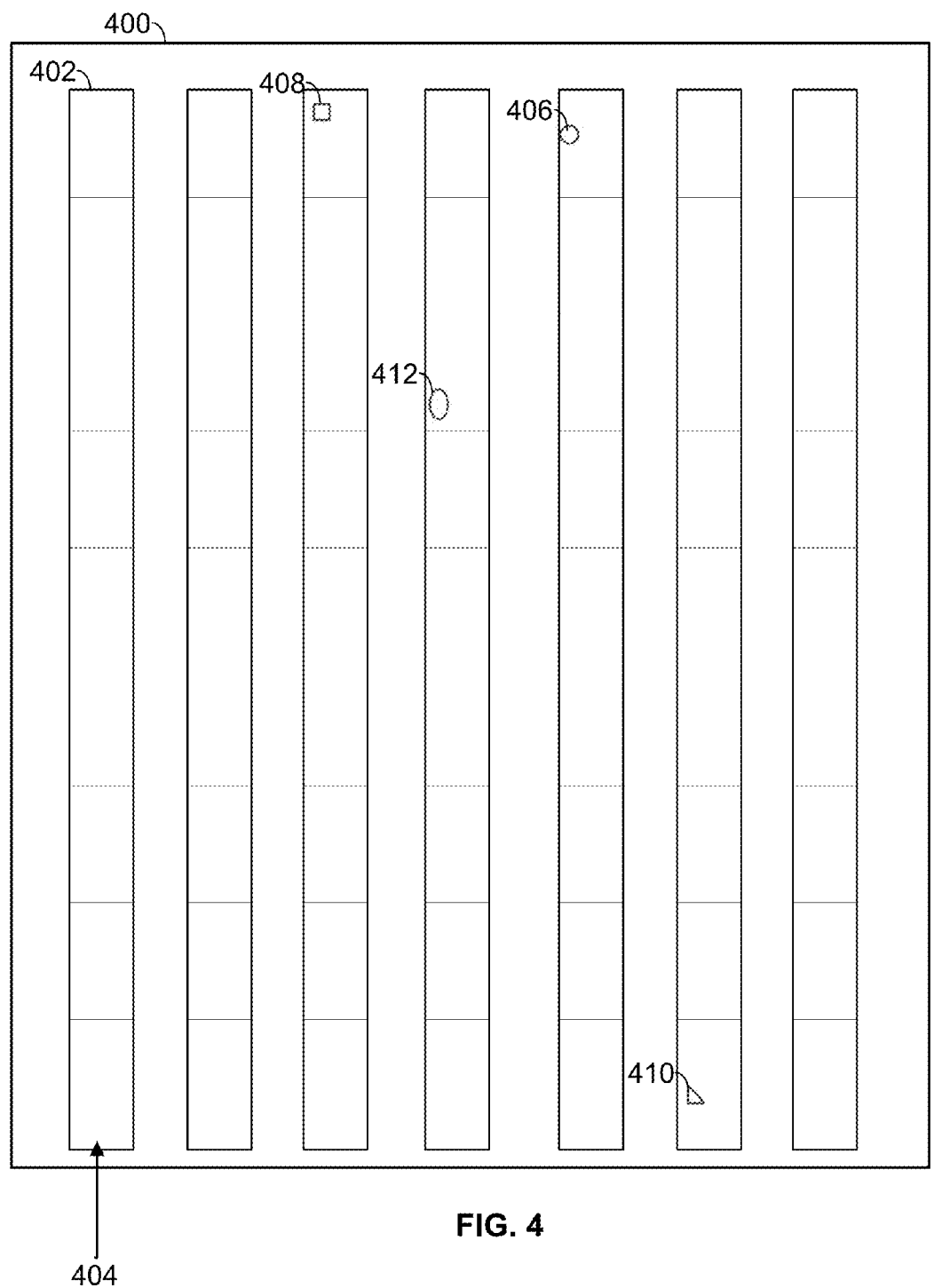
FIG. 4 depicts a PV farm, in accordance with an embodiment of the present invention.

Details regarding sensors 106 are described herein with respect to FIG. 4.

Figure 2:
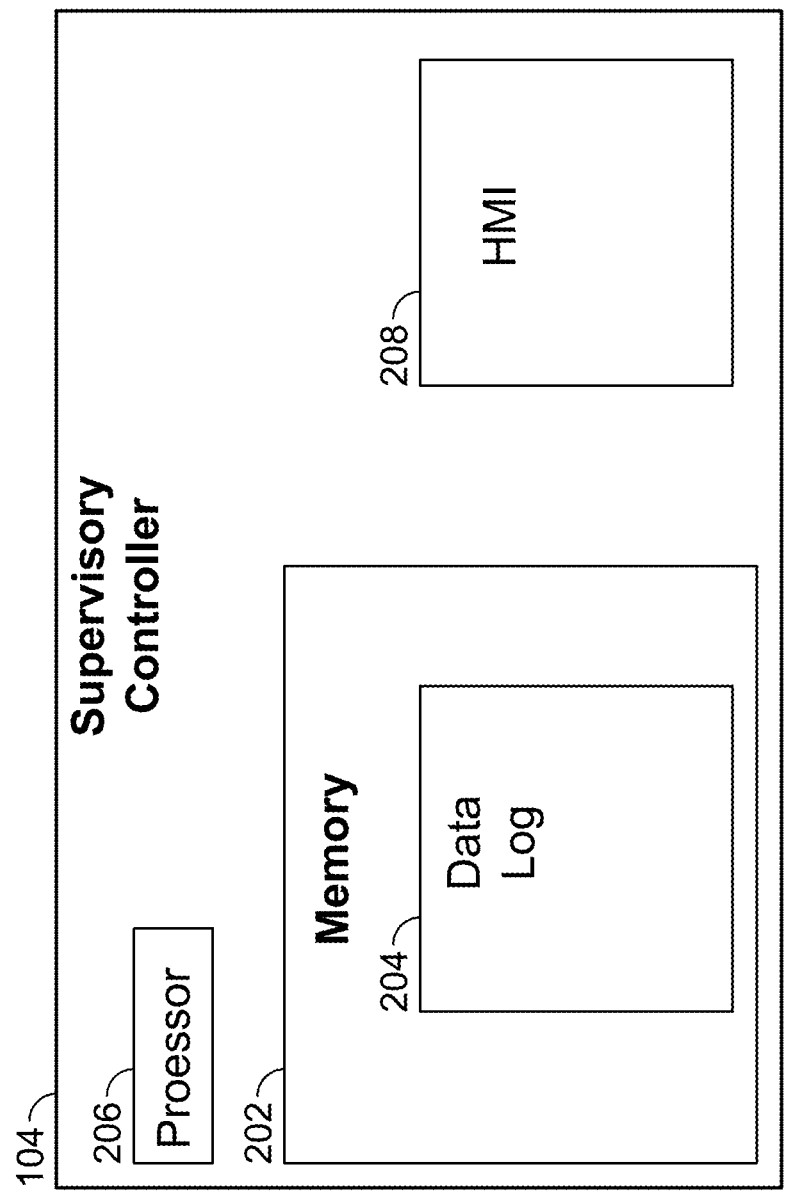
FIG. 2 depicts functional components of a supervisory controller, in accordance with an embodiment of the present invention.

FIG. 2 depicts functional components of a supervisory controller, in accordance with an embodiment of the present invention. Supervisory controller 104 includes a memory 202, a processor 206, and a human machine interface (HMI) 208. Memory 202 stores a data log 204. Data log 204 may include a database. The database may store a list of all cleanings performed by PV cleaning system 102. Data log 204 may also include other details including the times cleanings were performed, error messages issued, manually performed cleanings, location of the cleanings, the number of cleaning cycles performed, alerts, etc. Data log 204 may be displayed to a user such as an operator using HMI 208. In an embodiment, the user may view a graphical user interface in HMI 208.

Figure 3:
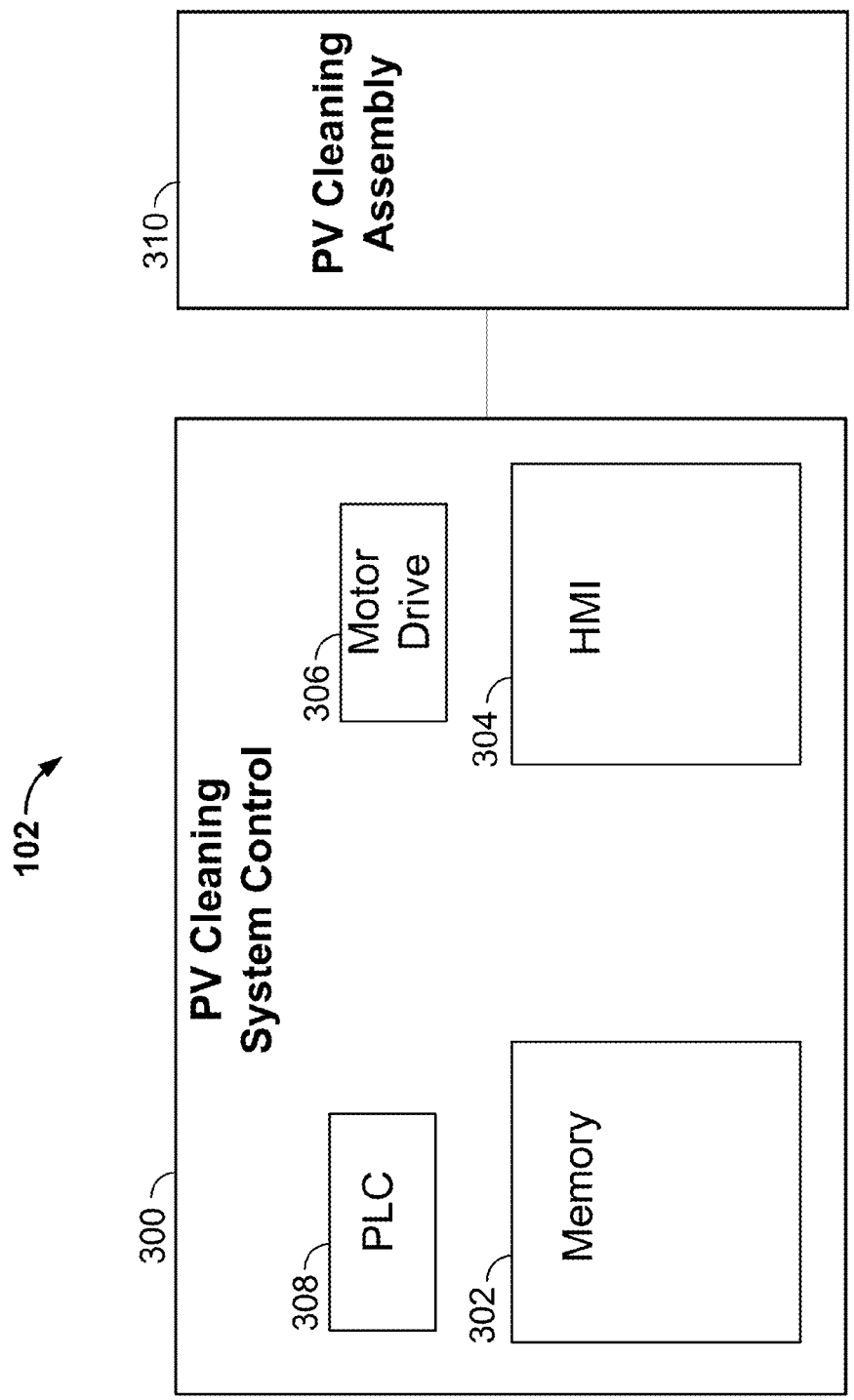
FIG. 3 depicts functional components of a PV cleaning system, in accordance with an embodiment of the present invention.

Processor 206 issues control signals to PV cleaning system 102 and receives incoming signals. For example, when processor 206 makes a determination that one or more PV panels need to be cleaned, processor 206 issues control signals that are sent to PV cleaning system 102, via network 101, to perform a cleaning A HMI system (not shown) may be connected to processor 206 to log a history of the PV panel cleaning system and also provide a way to manually control the cleaning system. Some parameters that may be logged are a history of how many times each PV panel has been cleaned, and the time and date each panel has been cleaned. Also, the HMI may allow a user such as maintenance operator to manually clean specific panels or provide an automatic cleaning schedule. In addition, the HMI can be used for troubleshooting purposes of the PV cleaning system, associated sensors, and actuators FIG. 3 depicts functional components of a PV cleaning system, in accordance with an embodiment of the present invention. PV cleaning system 102 includes a PV cleaning system control 300 and a PV cleaning assembly 310. PV cleaning system control 300 includes a memory 302, a HMI 304, a motor drive 306, and a PLC 308. Memory 302 may store instructions for interpreting control signals (sent from supervisory controller 104 via network 101). HMI 304 may provide an indication of a state of PV cleaning system 102. For example, when PV cleaning system 102 is performing a cleaning, the message "currently cleaning" may be displayed on HMI 304. Motor drive 306 and PLC 308 receive control signals (e.g. from supervisory controller 104) and transmit commands to carry out tasks (e.g. cleaning PV panel(s)) based on the control signals. Additional details of PV cleaning assembly 310 will be described herein with respect to FIGS. 6A and 6B.

FIG. 4 depicts a PV farm, in accordance with an embodiment of the present invention. PV farm 400 includes a multitude of PV panels. PV panel 404 is one of many PV panels in a PV panel string 402. PV farm 400 may include a multitude of PV panel strings 402. For example, seven PV panel strings may be included in PV farm 400. An array includes a series and parallel combinations of PV panel strings 402. A string is a set of solar cells connected in series.

Sensors 106 depicted in FIG. 1 may include sensors for taking weather related measurements, voltage, and current measurements. These sensors may comprise one or more of the following: an anemometer 406, a pyranometer 408, a converter 412 and a temperature sensor 410. In an embodiment, anemometer 406 is included in PV farm 400. Anemometer 406 records wind speed. More than one anemometer may be included in PV farm 400. For example, there may be an anemometer for each individual PV panel, each string of panels, etc.

PV farm 400 includes pyranometer 408 that records radiation. Specifically, pyranometer 408 measures thermal radiation. One or more pyranometers may be included in PV farm 400. For example, there may be a pyranometer for each individual PV panel, each string of panels, etc.

Each PV panel (or string of PV panels) may also include temperature sensor 410.

PV farm 400 includes converter 412. Converter 412 changes direct current (DC) to alternating current (AC). One or more converters may be included in PV farm 400. For example, there may be a converter for each individual PV panel, each string of panels, etc. One or more current transformers and current transducers may be included in PV farm 400. For example, there may be a current transformer and/or a current transducer for each individual PV panel, each string of panels, etc. Also, one or more voltage sensors and/or current sensors may be included in PV farm 400. For example, there may be a voltage sensor and/or a current sensor to measure voltage and/or current for each individual PV panel, each string of panels, etc. Other sensors (not shown) may be used. Converter 412 may be connected to the power grid of the PV panel farm. Converter 412 provides sub-parameters prior to performing the conversion from DC to AC. These sub-parameters may be DC voltage and current that is measured prior to the conversion.

In order to provide an efficient method of cleaning PV panels, supervisory controller 104 generates control signals. In an embodiment, the control signals are based on a decision making algorithm embedded in supervisory controller 104. Supervisory controller 104 receives actual current and voltage data (e.g. from one or more converters coupled to the PV farm) and weather related measurements (e.g. from one or more sensors) to determine expected power. Based on a comparison between the actual power data and expected power, supervisory controller 104 sends signals to the PLC to initiate the cleaning procedures. Details regarding the cleaning process are described herein.

Figure 5A:
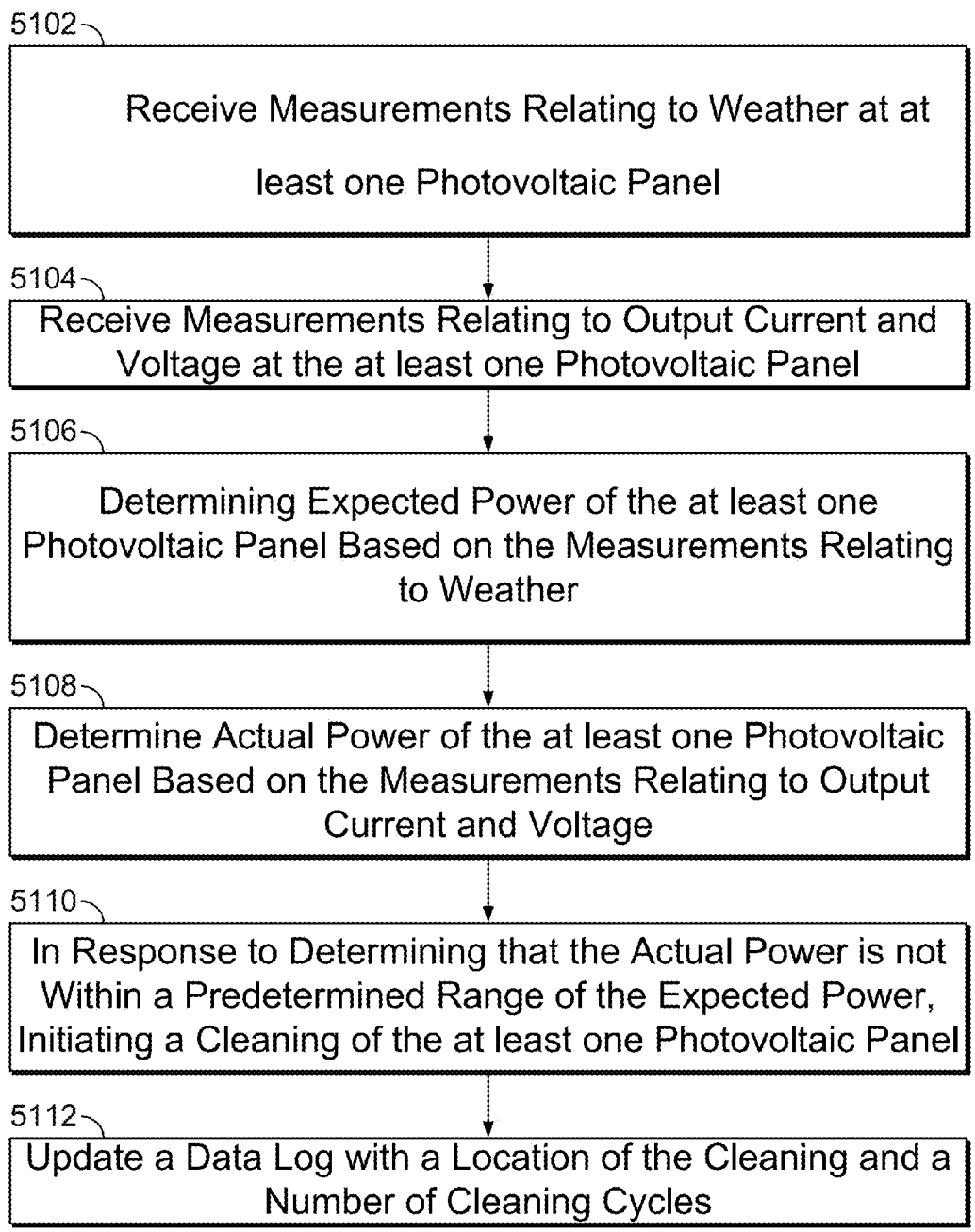
FIG. 5A depicts a flowchart for a method of cleaning PV panels based on measurements, in accordance with an embodiment of the present invention.

Details regarding another embodiment of cleaning PV panels are depicted in FIG. 5A. FIG. 5A depicts a flowchart for a method of cleaning PV panels based on measurements, in accordance with an embodiment of the present invention. At step 5102, measurements relating to weather at at least one PV panel are received. Supervisory controller 104 receives measurements relating to weather from sensors 106, via network 101. In an embodiment, sensors 106 may include one or more of anemometer 406, pyranometer 408, and/or temperature sensor 410. The weather related measurements may include one or more of the following: irradiance, temperature, wind speed, shading, and clouding measurements. In an embodiment, thermal radiation may be measured using pyranometer 408, which may also determine shading and clouding. Wind speed may be measured using anemometer 406. Other weather related measurements and sensors and/or devices may be used.

At step 5104, measurements relating to output current and voltage at the at least one PV panel are received. Actual DC and voltage output from one or more PV panels is read. Each PV panel, PV panel string, or PV panel farm may output current and output voltage. The output current may be measured by converter 412 prior to performing the conversion of current from DC to AC. In an embodiment, the output voltage and/or output current may read by a meter (not shown). The meter may be one of sensors 106. Supervisory controller 104 receives output current and voltage, via network 101.

Output voltage may also be measured by a meter and received at supervisory controller 104, via network 101.

At step 5106, expected power of the at least one PV panel is determined based on the measurements relating to weather. Supervisory controller 104 determines expected power based on the measurements relating to weather. Weather related measurements determined by sensors 106 (e.g. anemometer 406, pyranometer 408, temperature sensors 410, etc.) may be used to determine the expected power, herein referred to as P_expected. Also, the calculation of P_expected may include non-weather related decision variables such as PV panel(s) performance degradation factor, energy cost, and grid power constraints. The weather related measurements are communicated to supervisory controller 104 by sensors 106, via network 101. Based on the weather related measurements, an expected calculation of power is determined by supervisory controller 104. For example, if it is determined by sensors 106 that wind speed is measured at a certain amount of meters per second and thermal radiation is measured at a certain amount of degrees Celsius, an expected power based on these measurements is determined (e.g. by supervisory controller 104).

At step 5108, actual power of the at least one PV panel is determined based on the measurements relating to output current and voltage. Supervisory controller 104 determines the actual power based on the product of the output voltage and output current (from step 5104). The actual power is referred to herein as P_actual, the output voltage as V_out and the output current as I_out. P_actual is calculated as follows:

$$P\_actual = V\_out \times I\_out.$$

At step 5110, in response to determining that the actual power is not within a predetermined range of the expected power, a cleaning of at least one of the photovoltaic panels is initiated. Supervisory controller 104 initiates cleaning of one or more PV panels by sending a control signal (e.g. via processor 206) to PLC 308 and motor drive 306 of PV cleaning system control 300. In an embodiment, supervisory controller 104 may transmit a location of where the cleaning should occur to PLC 308 and motor drive 306. In response, PLC 308 and motor drive 306 activate PV cleaning assembly 310, (e.g. the brush) and which then begins cleaning the dirty panel or multiple panels. In an embodiment, the control signal received by PLC 308 and motor drive 306 may include the location of an entire PV panel string. In another embodiment, the control signal may include the location of multiple strings, multiple panels, etc. In another embodiment, supervisory controller 104 may initiate cleaning of one or more PV panels by sending a control signal (e.g. via processor 206) directly to motor drive 306 of PV cleaning system control 300, without implementing PLC 308. Details regarding the cleaning process are described herein.

At step 5112, a data log is updated with a location of the cleaning, a time of the cleaning, and a number of cleaning cycles. Supervisory controller 104 updates data log 204 with a location of the cleaning, a time of the cleaning, and a number of cleaning cycles (e.g. a number of times the cleaning was initiated for the particular location). For example, if a particular panel or a string of panels (identified by a particular location) has been cleaned twice, data log 204 is updated to include that the particular panel or a string of panels at the particular location has been cleaned twice. In an embodiment, the location of the particular panel or a string of panels may be stored in data log 204 as Cartesian coordinates on a two-dimensional grid covering the PV farm. In another embodiment, the location may be stored in terms of longitude and latitude coordinates determined by a global positioning system (GPS). Other identifiers for location may also be used.

In an embodiment, if the number of cleaning cycles exceeds a threshold limit, the data log is updated to recommend a manual inspection of the PV panel(s). Supervisory controller 104 determines that if a number of cleaning cycles exceeds a threshold limit (e.g. five cleanings per twelve hours), data log 204 is updated to recommend a manual inspection of the PV panel(s). In an embodiment, supervisory controller 104 may include instructions for terminating cleaning of the particular location of PV panels and/or PV panel strings for a period of time or until a manual inspection is performed. Supervisory controller 104 determines that if the threshold limit for the cleaning count has been reached, future cleanings of the photovoltaic panel are disabled. In an embodiment, a user may manually input or change the threshold limit, via the HMI. In another embodiment, the threshold limit may be automatically entered.

Figure 5B:
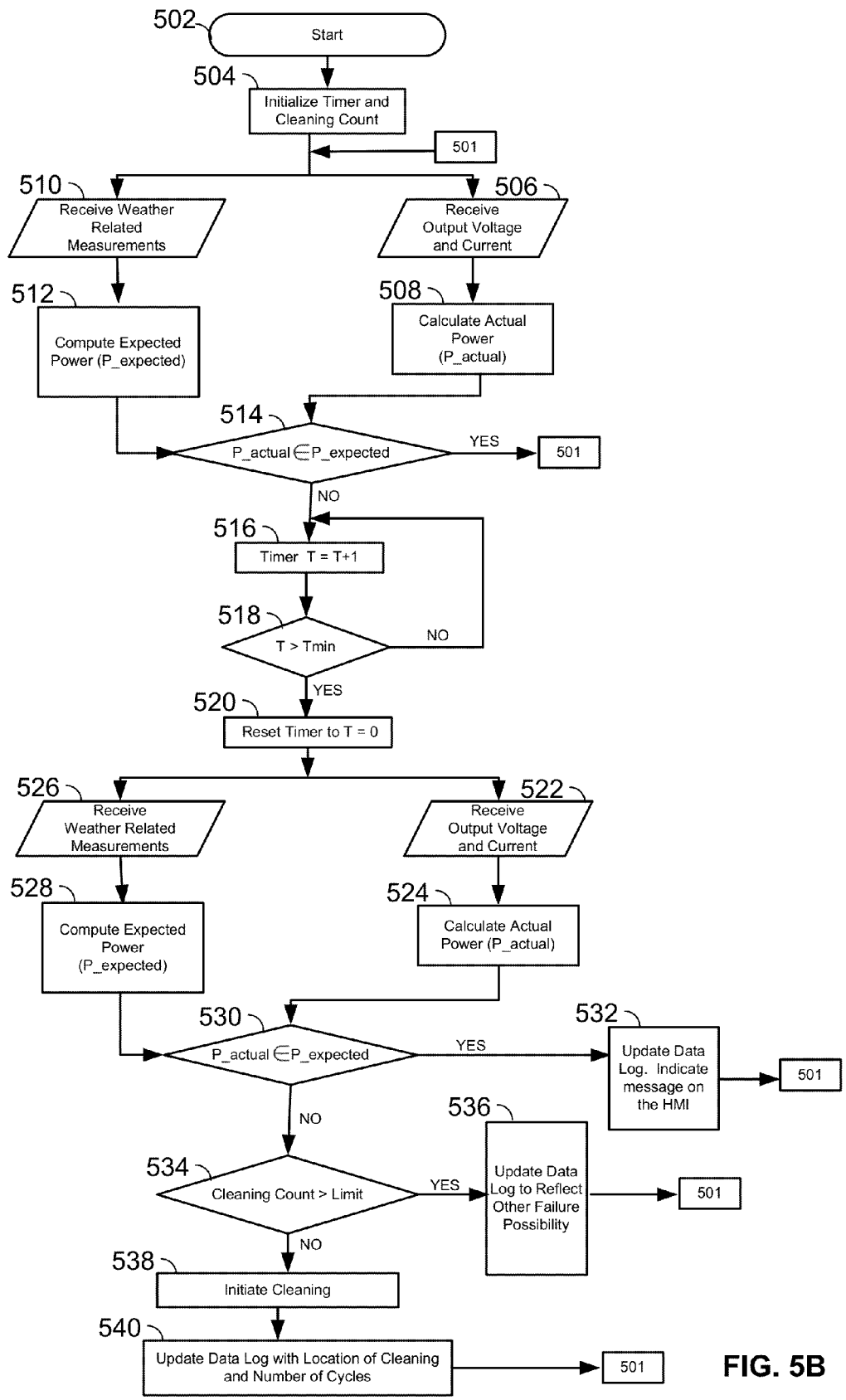
FIG. 5B depicts a flowchart for a method of cleaning PV panels, in accordance with an embodiment of the present invention.

FIG. 5B depicts a flowchart illustrating a method of cleaning PV panels, in accordance with another embodiment of the present invention. At step 502, the method starts. In an embodiment, the user may start the method by initiating a human-machine interface (HMI), via supervisory controller 104. In other embodiments, the method can also use default values without input from the HMI. In other embodiments, the user may begin the method by other means.

At step 504, the timer and cleaning count are initialized. For example, a user employing supervisory controller 104 may initialize the timer and the cleaning count using the HMI. In an embodiment, the timer is set to an amount of time in order to compensate for temporary reduced power readings due to clouding. Clouding refers to a temporary condition that causes the pyranometer to output temporary low solar irradiance values. For example, if a cloud in the sky is hovering over one or more panels on a cloudy day, the pyranometer may issue a lower than normal output. However, when the cloud passes, the pyranometer will then issue a normal output (i.e. normal irradiance reading). Therefore, by initializing a timer for a certain amount of time (e.g. twenty five minutes), the user may provide for ample time for clouds to pass and to compensate for clouding.

Suppose now that a tree or a more permanent artifact is blocking or reducing the amount of sunlight incident on one or more PV panels, and in turn, causing the pyranometer to issue a lower than normal irradiance reading. Alternatively, debris (e.g. bird droppings, dead insects, dirt, dust, snow, or other sources of debris) may be the cause of low pyranometer output. Effects of more permanent artifacts may be referred to as shading.

By initializing a cleaning count in step 504, unnecessary cleanings can be avoided. Suppose that a user initializes a cleaning count as five. By initializing a cleaning count, the user ensures that one or a set of PV panels is not cleaned over and over again. For example, the user may set a threshold to allow a maximum cleaning count of five cleanings per day. After five cleanings are performed and supervisory controller 104 continues to determine that a cleaning is required (e.g. a sixth cleaning is required), no further cleanings will be performed.

In another embodiment, at step 504, the timer and cleaning count may be automatically initialized without input from the user. For example, some default values may be used to initiate the timer and the cleaning count.

At step 506, output voltage and output current are received. Actual voltage and current output from one or more PV panels is received by supervisory controller 104. The actual current may be represented as DC. Each PV panel, PV panel string, or PV panel farm may output voltage and current. In an embodiment, the output current and voltage may be determined by converter 412, prior to performing conversion. In another embodiment, the output current and/or output voltage may be read by a meter (not shown). The meter may be one of sensors 106. Supervisory controller 104 receives output voltage and/or current, via network 101.

At step 508, supervisory controller 104 calculates the actual power based on the product of the output voltage and output current (from step 506). The actual power is referred to herein as P_actual, the output voltage as V_out and the output current as I_out. P_actual is calculated as follows:

$$P\_actual = V\_out \times I\_out.$$

At step 510, weather related measurements are received. Supervisory controller 104 receives measurements relating to weather from sensors 106, via network 101. In an embodiment, sensors 106 may include one or more of anemometer 406, pyranometer 408, and/or temperature sensor 410. The weather related measurements may include one or more of the following: irradiance, temperature, wind speed, shading, and clouding measurements. In an embodiment, solar irradiance may be measured using pyranometer 408, which may also determine shading and clouding. Wind speed may be measured using anemometer 406. Other weather related measurements and sensors and/or devices may be used.

At step 512, an expected power is computed based on one or more of the weather related measurements determined in step 510. Weather related measurements determined by sensors 106 (e.g. anemometer 406, pyranometer 408, temperature sensors 410, etc.) and received by supervisory controller 104 may be used to determine the expected power by supervisory controller 104, herein referred to as P_expected. Based on the weather related measurements, an expected calculation of power is determined. For example, if it is determined by sensors 106 that wind speed is measured and blowing at a certain amount of meters per second, the PV panel(s) temperature and ambient temperature have a certain degree Celsius measurement(s), and thermal radiation is measured at a certain amount of degrees Celsius, an expected power based on these measurements is determined (e.g. by supervisory controller 104).

In an embodiment, steps 506 and 508 are performed at substantially the same time as steps 510 and 512.

At step 514, supervisory controller 104 compares P_actual to P_expected to determine if P_actual belongs to the set of P_expected. For example, it may be determined whether P_actual falls within a certain range or threshold of P_expected (e.g. P_actual is 10% less than P_expected). In response to determining that P_actual belongs to the set of P_expected (i.e. a "yes" results from decision box 514), the method returns to block 501.

In response to determining that P_actual does not belong to the set of P_expected (i.e. a "no" results from decision box 514) by supervisory controller 104, the method continues onto step 516.

At step 516, the timer is incremented by supervisory controller 104. The timer may begin counting down and is incremented. For example, if the timer had been initialized at a predetermined amount of time (Tmin), the timer begins from zero and increments until the predetermined amount of time is reached.

At step 518, it is determined, by supervisory controller 104, whether a Tmin value is reached/is exceeded. Tmin may be set at step 504. In response to determining by supervisory controller 104 that the timer T is not greater than Tmin (e.g. a "no" results from decision box 518), the method returns to step 516. This forces the method to wait a predetermined amount of time (Tmin) before continuing in order to avoid unnecessary cleanings.

In response to determining, by supervisory controller 104, that the timer T is greater than Tmin (e.g. a "yes" results from decision box 518), the flowchart continues on to step 520, where the timer is reset to 0. The previously computed power calculations are made once again. In an embodiment, the reason why the power calculations are made a second time after waiting the time limit is to accommodate any temporary reduced power measurements due to clouding. Thus, computing the power calculations a second time ensures that unnecessary cleaning due to clouding are not made. This helps in reducing cost and environmental effects due to unnecessary cleanings when panels are not dirty.

The flowchart continues on to step 522 and step 526. At step 522, output voltage and output current are received. Step 522 is substantially similar to step 506, and may be implemented as described above with respect to step 506.

At step 524, which is substantially similar to step 508, supervisory controller 104 calculates the actual power based on the product of the output voltage and output current (from step 522). As described above with respect to step 508, the actual power is referred to herein as P_actual, the output voltage as V_out and the output current as I_out. P_actual is calculated as follows:

$$P\_actual = V\_out \times I\_out.$$

At step 526, weather related measurements are received. Step 526 is substantially similar to step 510, and may be implemented as described above with respect to step 510.

At step 528, an expected power is computed based on one or more of the weather related measurements determined in step 526. Step 528 is substantially similar to step 512, and may be implemented as described above with respect to step 512.

In an embodiment, steps 522 and 524 are performed at substantially the same time as steps 526 and 528.

At step 530, supervisory controller 104 compares P_actual to P_expected to determine if P_actual belongs to the set of P_expected. For example, it may be determined whether P_actual falls within a certain range or threshold of P_expected (e.g. P_actual is 10% less than P_expected). In response to determining that P_actual belongs to the set of P_expected (i.e. a "yes" results from decision box 530), data log 204 is updated to reflect that the decrease in power is due to weather related variations and a message indicating the reason for the decrease in power is displayed on the HMI. The method returns to block 501, where steps 510 and 506 are repeated.

In response to determining, by supervisory controller 104, that P_actual does not belong to the set of P_expected (i.e. a "no" results from decision box 530), the flowchart continues onto step 534. At step 534, a determination is made whether the cleaning count (initialized in step 504) is greater than a preset limit. This determination is made in order to reduce unnecessary cleanings.

In response to determining, by supervisory controller 104, that the cleaning count is greater than the preset limit (e.g. a "yes" results from decision box 534), the flowchart continues to step 536. In an embodiment, the cleaning count may be for a certain location (e.g. a location encompassing one or more PV panels). At step 536, data log 204 is updated to reflect other failure possibility. In an embodiment, a data log message may be displayed on the HMI that recommends manual inspection at one or more PV panels. If a panel is repeatedly cleaned and is still outputting power measurements that fall below a predetermined range of expected power, then something else may be faulty with the PV panel and/or sensors. For example, one of the sensors may be damaged or broken. The manual inspection is thus recommended as initiating a cleaning will not solve these types of problems. The method returns to block 501.

In response to determining, by supervisory controller 104, that the cleaning count is not greater than the preset limit (e.g. a "no" results from decision box 534), the flowchart continues to step 538. At step 538, cleaning is initiated. Supervisory controller 104 sends a signal (e.g. via processor 206) to PLC 308 and motor drive 306 of PV cleaning system control 300 with a location of where the cleaning should occur. In response, PV cleaning system control 300 activates PV cleaning assembly 310 which activates the brush. In an embodiment, at step 538, the cleaning count is incremented. Details regarding the brush and PV cleaning assembly 310 are described herein.

In an embodiment, cleaning may be performed on an individual PV panel basis. In another embodiment, if weather related measurements and voltage and current measurements are determined for multiple PV panels (e.g. a string of PV panels) then all of the multiple PV panels may be cleaned at once.

At step 540, the data log is updated with the location of the cleaning that is performed as a result of step 538 and the number of cleaning cycles that were performed. Supervisory controller 104 updates data log 204. In an embodiment, the location may be displayed on the HMI. The method then returns to block 501.

In accordance with an embodiment, setting a timer, incrementing the timer as in step 516, initializing a cleaning count and/or determining whether the cleaning count has reached a limit, as in step 534 may be optional. In such an embodiment where the timer and cleaning count is not taken into consideration, the flowchart of FIG. 5B would include the following steps. First, at step 502, the HMI is initiated at the start of the flowchart. After step 502, the flowchart would continue on to steps 506 and 510 (as step 504 would not be included). The flowchart would also include steps 508, 512, and 514. Details regarding these steps are described above with respect to FIG. 5B. After step 514, the flowchart would continue on to step 538, in response to "no" decision to step 514. After step 538, the method would continue onto step 540 and then to block 501.

In response to a "yes" decision to step 514, the flowchart would continue onto block 501. Any intermediate steps between 514 and 538 would not be included in the embodiment without the timer and cleaning count.

Figure 6A:
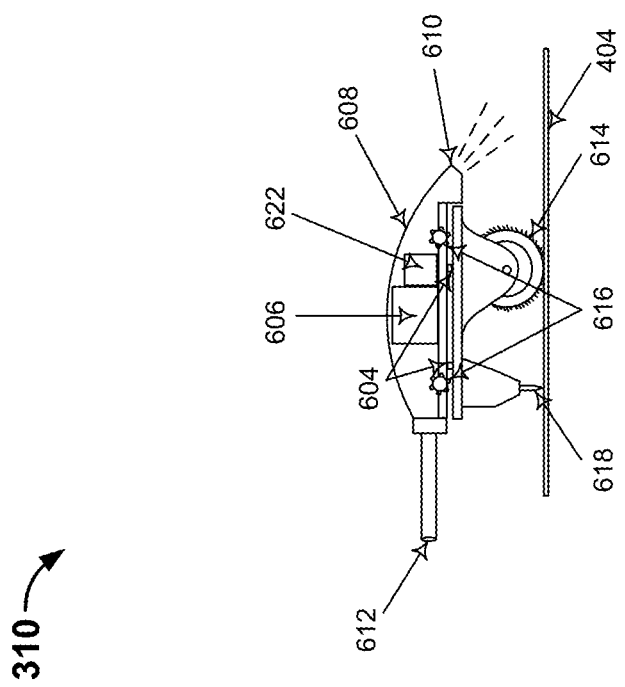
FIG. 6A depicts a side view of an exemplary PV cleaning system, in accordance with an embodiment of the present invention.
Figure 7:
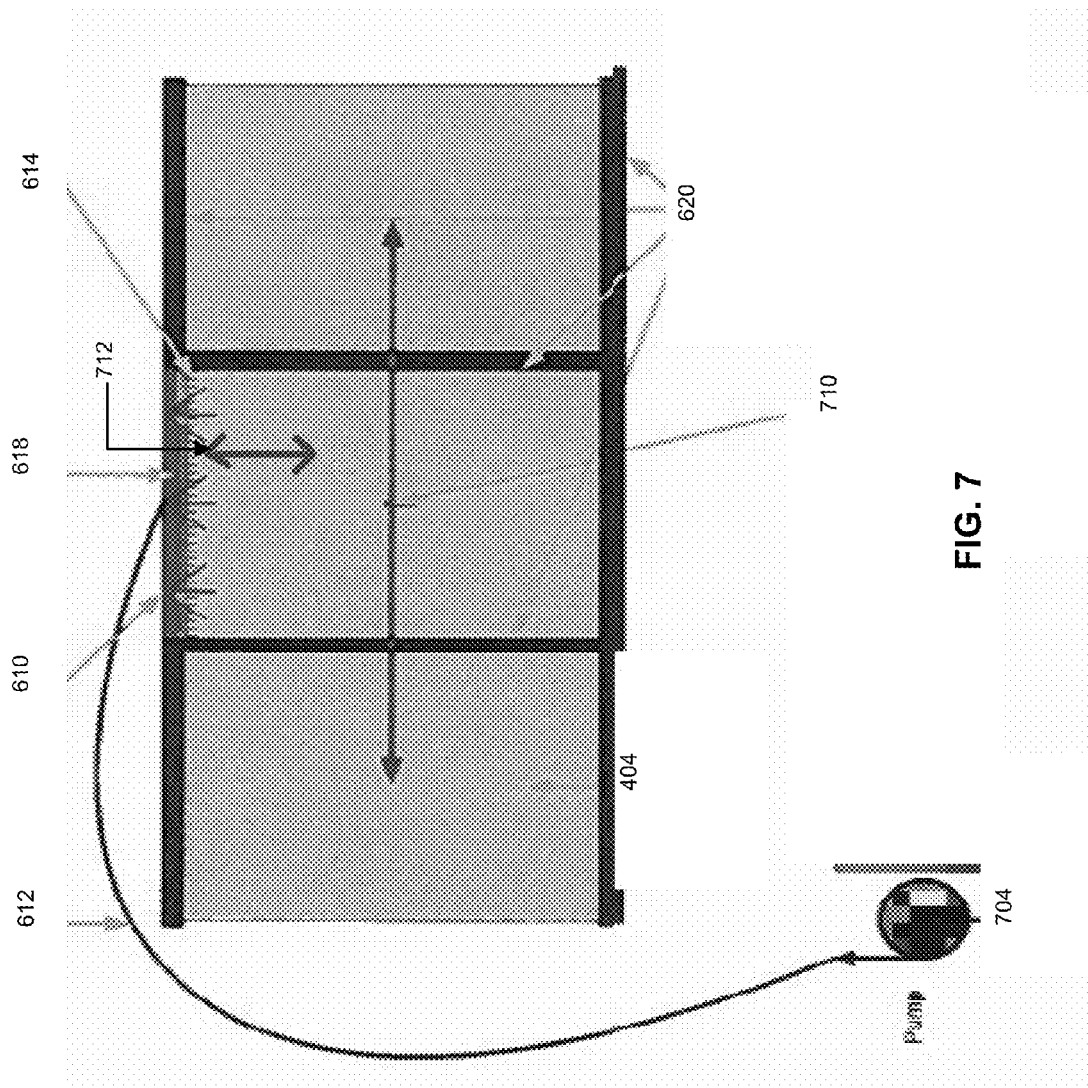
FIG. 7 depicts movement of a PV cleaning system, in accordance with an embodiment of the present invention.

FIG. 6A depicts a side view of an exemplary PV cleaning system, in accordance with an embodiment of the present invention. PV cleaning assembly 310 may be mounted on a PV panel surface 404. PV cleaning assembly 310 may be permanently, semi-permanently, or temporarily affixed to and/or mounted onto PV panel surface 404. In an embodiment, PV cleaning assembly 310 may be permanently affixed to multiple PV panels (e.g. a PV panel string) using a rack and pinion linear actuator. PV cleaning assembly 310 includes a brush assembly enclosure 608. Brush assembly enclosure 608 includes a rotating brush and bristles 614, pinion gears 616, a motor 622, a coupling housing 606, a squeegee 618, nozzles 610, screw actuators 604, and a flexible conduit 612. Pinion gears 616 move PV cleaning assembly 310 along rails (as illustrated in FIG. 7). Motor 622 rotates brush and bristles 614 and rotates pinion gears 616 to move PV cleaning assembly 310. Screw actuators 604 engage rotating brush and bristles 614 and dispense squeegee 618. In an embodiment, rotating brush and bristles 614 and squeegee 618 move vertically while PV cleaning assembly 310 is in motion and cleaning is not activated. In this way, rotating brush and bristles 614 and squeegee 618 are lowered onto PV panel surface 404 when cleaning is activated and at other times when PV cleaning assembly 310 is moving, rotating brush and bristles 614 and squeegee 618 do not touch the surface of PV panels as they are disengaged and elevated by actuators 604. PV cleaning assembly 310 includes rotating brush and bristles 614 and squeegee 618. Nozzles 610 dispense cleaning solution. Flexible conduit 612 may house a bus to supply signals, a power bus as well as a cleaning supply line bus. The bus to supply signals may be connected to PLC 308 or motor drive 306 and provide communication signals. Another bus may be connected to a power source and supply power. The cleaning supply line bus may be connected to a cleaning solution reservoir and/or pump (not shown) to provide cleaning solution. In an embodiment, the width of PV cleaning assembly 310 is the width of a standard PV panel.

In another embodiment, PV cleaning assembly 310 includes PV cleaning system control 300.

Figure 6B:
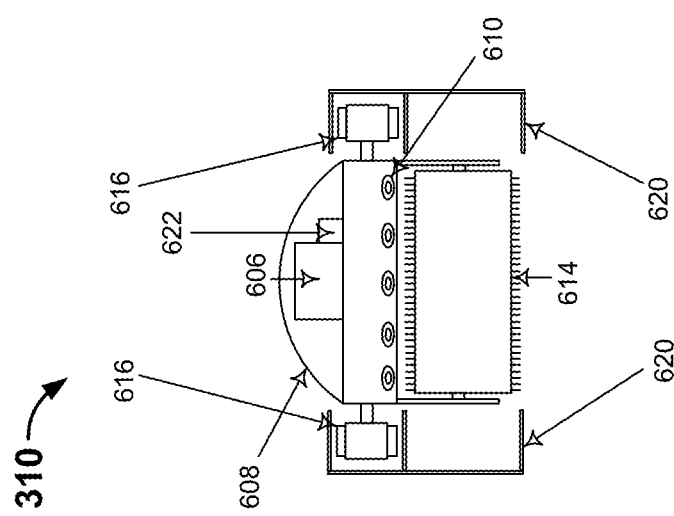
FIG. 6B depicts a front view of an exemplary PV cleaning system, in accordance with an embodiment of the present invention.

FIG. 6B depicts a front view of an exemplary PV cleaning system, in accordance with an embodiment of the present invention. In the front view, tracks 620 are shown. Tracks 620 (or rails) are provided for pinion gears 616 to move along. In the front view depicted by FIG. 6B, squeegee 618 is located behind rotating brush and bristles 614 and is not visible.

When a communication signal is received from supervisory controller 104 to PV cleaning system 102 to clean one or more PV panels (in accordance with the method depicted by FIG. 5A and/or FIG. 5B), PV cleaning assembly 310 moves into a location supplied by supervisory controller 104 to PLC 308 and motor drive 306. The location is supplied by control signals. Specifically, PLC 308 and motor drive 306 instructs PV cleaning assembly 310 as follows. PV cleaning assembly 310 moves into the specified location by tracks 620. Upon reaching the location of the dirty PV panel(s) and/or PV panel string, screw actuators 604 engage rotating brush and bristles 614 and squeegee 618. A command (e.g. a control signal) is sent to dispense cleaning solution via nozzles 610. As nozzles 610 dispense the solution, PV cleaning assembly 310 travels from left to right in FIG. 6A. Rotating brush and bristles 614 clean PV panel surface 404 and squeegee 618 dries PV panel surface 404 in a streak-free manner. After cleaning is performed, screw actuators 604 disengage rotating brush and bristles 614 and squeegee 618 and rotating brush and bristles 614 and squeegee 618 retract vertically onto PV cleaning assembly 310 so that PV cleaning assembly 310 is free to move to the next location where cleaning is required.

FIG. 7 depicts movement of a PV cleaning system, in accordance with an embodiment of the present invention. PV cleaning assembly 310 moves along tracks 620. Tracks 620 move in a horizontal direction, shown by 710. In another embodiment, one set of tracks may move in one direction (e.g. vertically) while the other set of tracks moves in another direction (e.g. horizontally). PV cleaning assembly 310 (including rotating brush and bristles 614, nozzles 610 and squeegee 618) may move along PV panel surface 404. In an embodiment, PV cleaning assembly 310 may move only in a vertical direction. PV cleaning assembly 310 may be mounted on the vertical tracks and may move vertically, as shown by 712. In an embodiment, PV cleaning assembly 310 may move horizontally as needed within the horizontal tracks (which are stationary). When PV cleaning assembly 310 is placed in a location where cleaning is required, screw actuators 604 (not shown in FIG. 7) engage rotating brush and bristles 614 and squeegee 618. In the embodiment depicted by FIG. 7, a pump 704 is used to dispense cleaning solution to PV cleaning assembly 310, via flexible conduit 612. The cleaning solution is dispensed via nozzles 610, and rotating brush and bristles 614 rotate to clean the PV panel surface, followed by squeegee 618, which dries the cleaning solution. After cleaning is performed, screw actuators 604 disengage rotating brush and bristles 614 and squeegee 618 and rotating brush and bristles 614 and squeegee 618 retract vertically onto PV cleaning assembly 310 so that PV cleaning assembly 310 is free to move to the next location where cleaning is required. Therefore, screw actuators 604 enable PV cleaning assembly 310 to move without dragging of rotating brush and bristles 614 and squeegee 618.

The PV cleaning system provides a low-cost, highly efficient automated cleaning procedure of PV panels. This in turn can increase the efficiency of the PV farm and reduce the maintenance hours and water usage. Some of the present embodiment includes low cost implementation, increased efficiency, less water waste, flexibility in terms of having an automated or scheduled cleaning, practical approach, similar to window washing system on automobiles, less dependence on PV panel maintenance for cleaning and increased safety.

In various embodiments, the method steps described herein, including the method steps described in FIGS. 5A and 5B, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 5A and 5B. Certain steps of the methods described herein, including one or more of the steps of FIGS. 5A and 5B, may be performed by a server or by another processor in a network-based cloud-computing system. Certain steps of the methods described herein, including one or more of the steps of FIGS. 5A and 5B, may be performed by a client computer in a network-based cloud computing system. The steps of the methods described herein, including one or more of the steps of FIGS. 5A and 5B, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 5A and 5B, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 8:
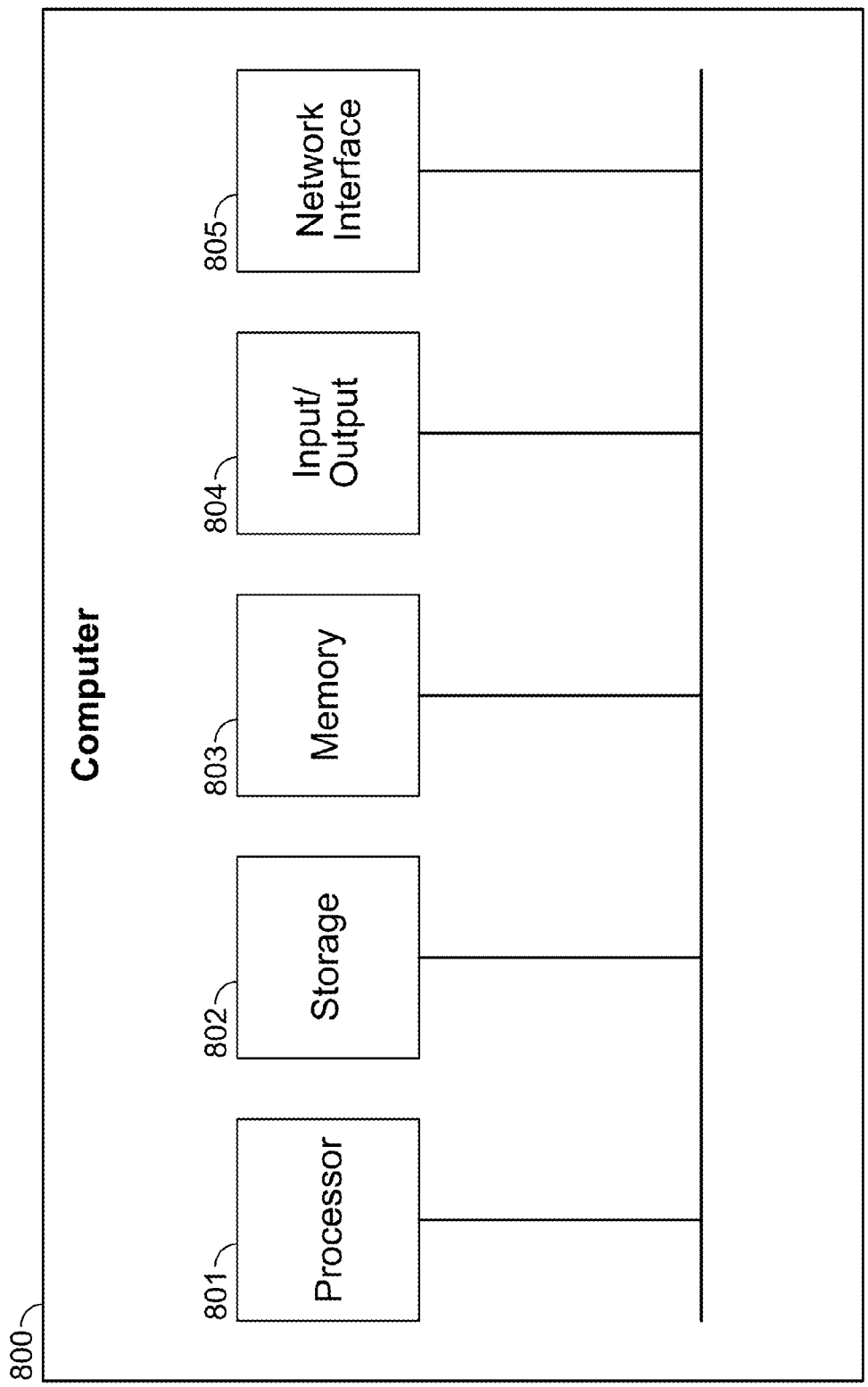
FIG. 8 shows components of a computer that may be used to implement the invention.

A high-level block diagram of an exemplary computer that may be used to implement systems, apparatus and methods described herein is illustrated in FIG. 8. Computer 800 includes a processor 801 operatively coupled to a data storage device 802 and a memory 803. Processor 801 controls the overall operation of computer 800 by executing computer program instructions that define such operations. The computer program instructions may be stored in data storage device 802, or other computer readable medium, and loaded into memory 803 when execution of the computer program instructions is desired. Thus, the method steps of FIGS. 5A and 5B can be defined by the computer program instructions stored in memory 803 and/or data storage device 802 and controlled by the processor 801 executing the computer program instructions. For example, the computer program instructions can be implemented as computer executable code programmed by one skilled in the art to perform an algorithm defined by the method steps of FIGS. 5A and 5B. Accordingly, by executing the computer program instructions, the processor 801 executes an algorithm defined by the method steps of FIGS. 5A and 5B. Computer 800 also includes one or more network interfaces 804 for communicating with other devices via a network. Computer 800 also includes one or more input/output devices 805 that enable user interaction with computer 800 (e.g., display, keyboard, mouse, speakers, buttons, etc.).

Processor 801 may include both general and special purpose microprocessors, and may be the sole processor or one of multiple processors of computer 800. Processor 801 may include one or more central processing units (CPUs), for example. Processor 801, data storage device 802, and/or memory 803 may include, be supplemented by, or incorporated in, one or more application-specific integrated circuits (ASICs) and/or one or more field programmable gate arrays (FPGAs).

Data storage device 802 and memory 803 each include a tangible non-transitory computer readable storage medium. Data storage device 802, and memory 803, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 805 may include peripherals, such as a printer, scanner, display screen, etc. For example, input/output devices 805 may include a display device such as a cathode ray tube (CRT) or liquid crystal display (LCD) monitor for displaying information to the user, a keyboard, and a pointing device such as a mouse or a trackball by which the user can provide input to computer 800.

Any or all of the systems and apparatus discussed herein, including PV cleaning system 102, PV cleaning system control 300, PV cleaning assembly 310, processor 206, memory 202, data log 204, HMI 208, supervisory controller 104, sensors 106, memory 302, HMI 304, motor drive 306, and PLC 308, may be implemented using a computer such as computer 800.

One skilled in the art will recognize that an implementation of an actual computer or computer system may have other structures and may contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:
1. A method of cleaning photovoltaic panels in a solar energy system, the method comprising:
receiving pyranometer measurements relating to weather conditions at a photovoltaic panel;

receiving measurements relating to output current and voltage at the photovoltaic panel;

determining expected power of the photovoltaic panel based on the measurements relating to weather conditions;

determining actual power of the photovoltaic panel based on the measurements relating to output current and voltage;

in response to determining that the actual power is not within a predetermined range of the expected power, initiating a cleaning of the photovoltaic panel; and updating a data log with a location of the cleaning, a time stamp of the cleaning and a number of cleaning cycles, wherein if the number of cleaning cycles exceeds a threshold limit comprising a number of cleaning cycles within a time period, updating the data log to recommend a manual inspection of the photovoltaic panel.

2. The method of cleaning photovoltaic panels in a solar energy system of claim 1, wherein if the threshold limit has been reached, disabling future cleanings of the photovoltaic panel.

3. The method of cleaning photovoltaic panels in a solar energy system of claim 1, wherein the measurements relating to weather conditions comprise measurements relating to at least one of irradiance, temperature, wind speed, shading, and clouding.

4. The method of cleaning photovoltaic panels in a solar energy system of claim 1, further comprising:

prior to the step of initiating a cleaning of the photovoltaic panel: waiting a period of time after the step of determining actual power of the photovoltaic panel;

receiving second measurements relating to weather conditions at the photovoltaic panel after waiting the period of time;

receiving second measurements relating to output current and voltage at the photovoltaic panel after waiting the period of time;

determining second expected power of the photovoltaic panel based on the second measurements relating to weather conditions;

determining second actual power of the photovoltaic panel based on the second measurements relating to the output current and voltage; and determining that the second actual power is not within the predetermined range of the second expected power.

5. The method of cleaning photovoltaic panels in a solar energy system of claim 1, wherein the photovoltaic panel comprises a string of photovoltaic panels.

6. A system comprising:

sensors configured to measure weather related conditions, and output current and voltage of a photovoltaic panel, the sensors comprising a pyranometer;

a supervisory controller configured to:
generate a control signal to initiate a cleaning of the photovoltaic panel, the control signal generated based at least on an expected power of the photovoltaic panel based on the measurements relating to weather and an actual power of the photovoltaic panel based on the measurements relating to output current and voltage;

update a data log with a location of the cleaning, a time stamp of the cleaning and a number of cleaning cycles, wherein if the number of cleaning cycles exceeds a threshold limit comprising a number of cleaning cycles within a time period, updating the data log to recommend a manual inspection of the photovoltaic panel; and a photovoltaic cleaning assembly disposed on an array of photovoltaic panels, the photovoltaic cleaning assembly configured to clean the photovoltaic panel in response to receiving the control signal from the supervisory controller.

7. The system of claim 6, wherein the supervisory controller is further configured to determine whether the actual power is within a predetermined range of the expected power.

8. The system of claim 6, wherein the photovoltaic cleaning assembly further comprises a brush assembly comprising at least one of a rotating brush, bristles, nozzles, actuators, a motor and a squeegee.

9. The system of claim 6, wherein the measurements related conditions comprise measurements relating to at least one of irradiance, temperature, wind speed, shading, and clouding.

10. The system of claim 6, wherein the photovoltaic panel comprises a string of photovoltaic panels.

11. The system of claim 6, wherein the sensors comprise at least one of an anemometer, a current sensor, a voltage sensor and a temperature sensor.

12. A non-transitory computer readable medium storing computer program instructions, which when executed on a processor cause the processor to perform a method comprising:

receiving pyranometer measurements relating to weather conditions at a photovoltaic panel;

receiving measurements relating to output current and voltage at the photovoltaic panel;

determining expected power of the photovoltaic panel based on the measurements relating to weather; determining actual power of the photovoltaic panel based on the measurements relating to output current and voltage;

in response to determining that the actual power is not within a predetermined range of the expected power, initiating a cleaning of the photovoltaic panel; and updating a data log with a location of the cleaning, a time stamp of the cleaning and a number of cleaning cycles, wherein if the number of cleaning cycles exceeds a threshold limit comprising a number of cleaning cycles within a time period, updating the data log to recommend a manual inspection of the photovoltaic panel.

13. The non-transitory computer readable medium of claim 12, wherein if the threshold limit has been reached, disabling future cleanings of the photovoltaic panel.

14. The non-transitory computer readable medium of claim 12, wherein the measurements relating to weather conditions comprise measurements relating to at least one of irradiance, temperature, wind speed, shading, and clouding.

15. The non-transitory computer readable medium of claim 12, further comprising:

prior to the step of initiating a cleaning of the photovoltaic panel:

waiting a period of time after the step of determining actual power of the photovoltaic panel;

receiving second measurements relating to weather conditions at the photovoltaic panel after waiting the period of time;

receiving second measurements relating to output current and voltage at the photovoltaic panel after waiting the period of time;

determining second expected power of the photovoltaic panel based on the second measurements relating to weather conditions;

determining second actual power of the photovoltaic panel based on the second measurements relating to the output current and voltage; and determining that the second actual power is not within the predetermined range of the second expected power.

16. The non-transitory computer readable medium of claim 12, wherein the photovoltaic panel comprises a string of photovoltaic panels.

* * * * *